F. PFEFFER.
ADJUSTABLE SUPPORT.
APPLICATION FILED APR. 4, 1916.
1,214,584.
Patented Feb. 6, 1917.
3 SHEETS—SHEET 3.
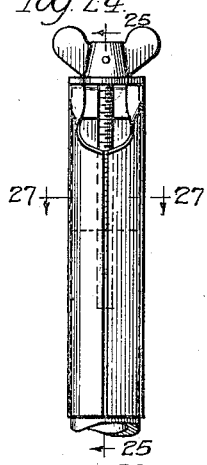
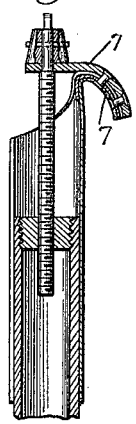
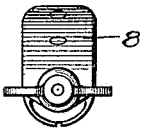
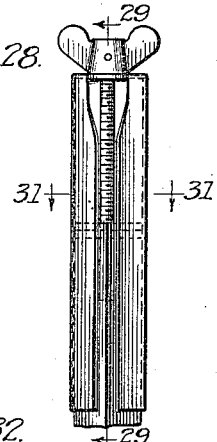
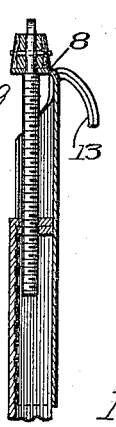
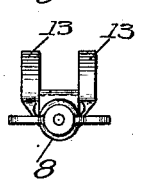
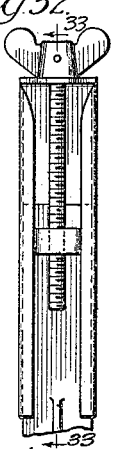
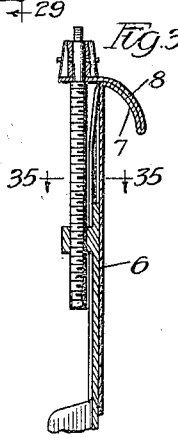
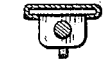
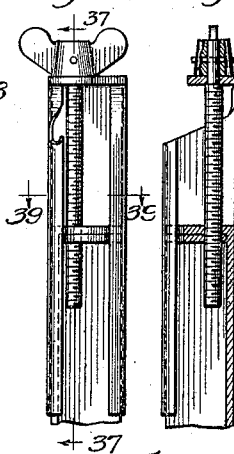
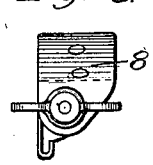
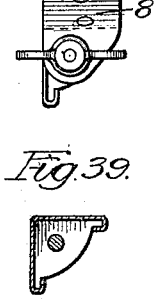

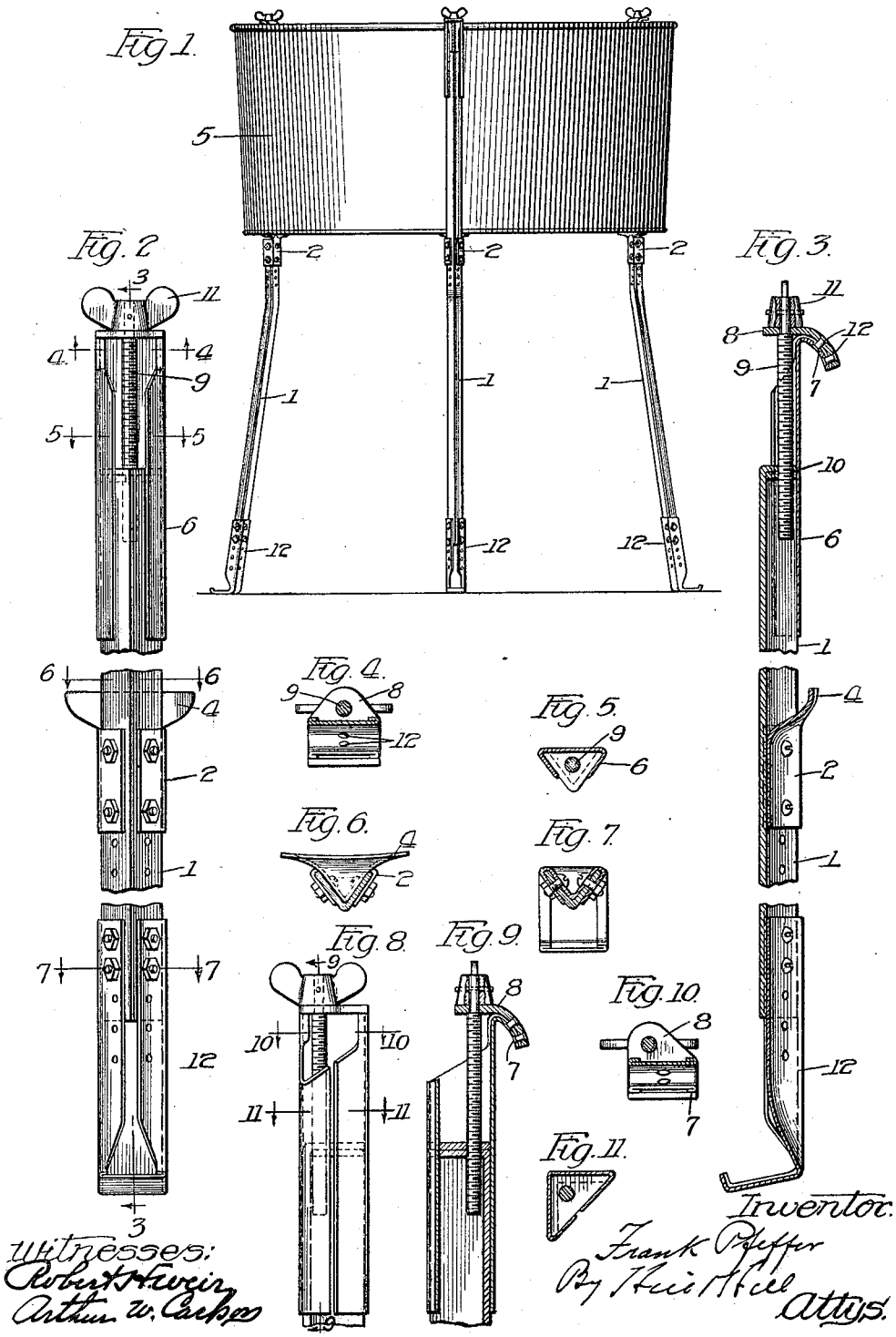

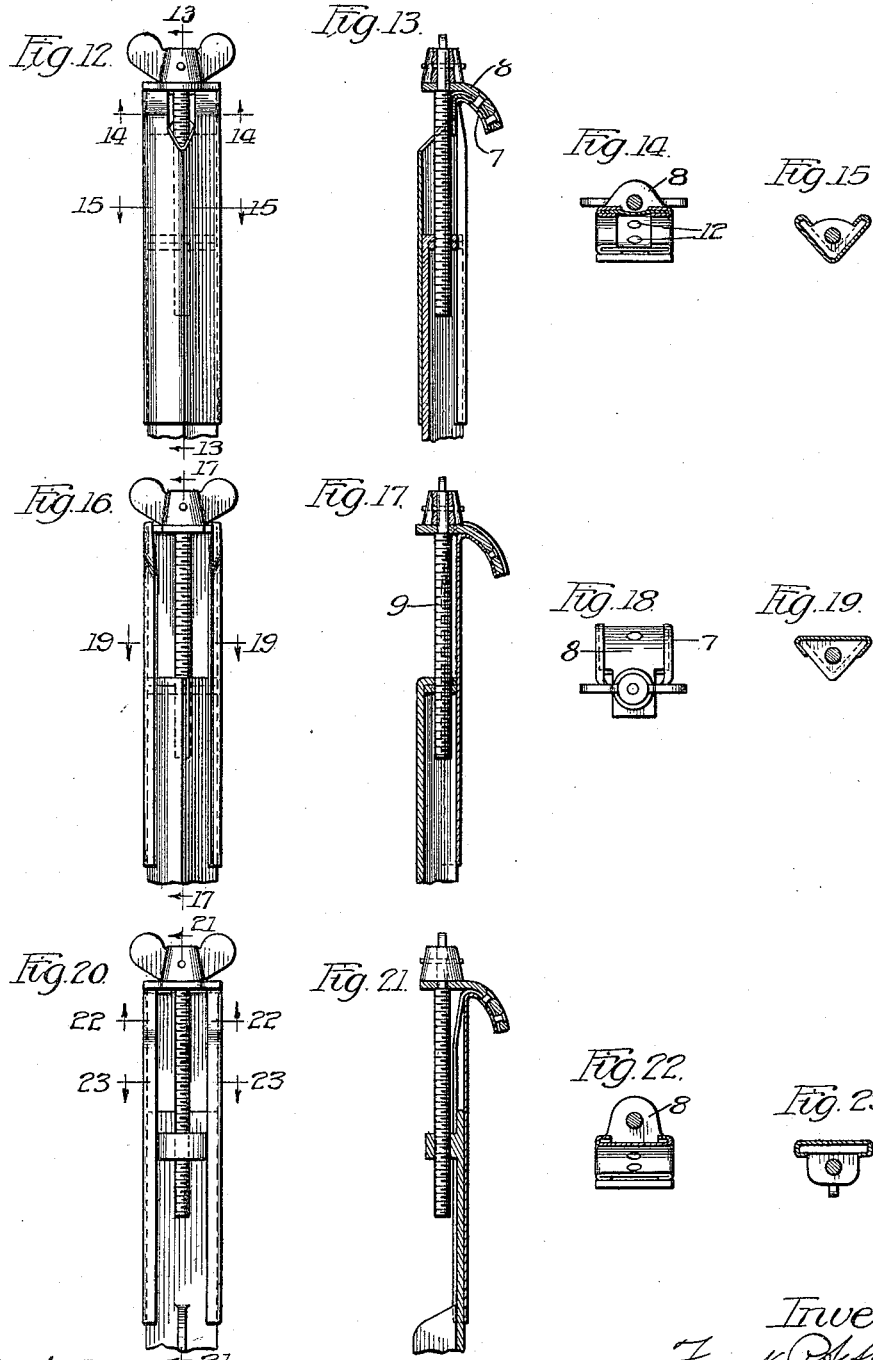

UNITED STATES PATENT OFFICE.

FRANK PFEFFER, OF CHICAGO, ILLINOIS.

ADJUSTABLE SUPPORT.

1,214,584.

Specification of Letters Patent.

Patented Feb. 6, 1917.

Application filed April 4, 1916. Serial No. 88,792.

*To all whom it may concern:*

Be it known that I, FRANK PFEFFER, a citizen of the United States, residing at Chicago, in the county of Cook and State of Illinois, have invented certain new and useful Improvements in Adjustable Supports, of which the following is a description.

My invention belongs to that general class of devices adapted to support some article, such for illustration as a wash tub, or equivalent article, and has for its object to provide such an article that will be readily adjusted as to height, and also readily adjusted as to width or height of the article to be supported.

It has as an additional object to provide such an article at low cost that shall at once be attractive in appearance, practical in operation, and durable in its use.

To this end my invention consists in the novel construction, arrangement and combination of parts herein shown and described, and more particularly pointed out in the claims.

In the drawings, wherein like reference characters indicate like or corresponding parts, Figure 1 is a side elevation of a tub supported upon my improved device, and illustrating the manner of its use; Fig. 2 is an elevational view of one of the legs in Fig. 1; Fig. 3 is a longitudinal section of the same taken in line 3—3 of Fig. 2; Figs. 4, 5, 6 and 7 are transverse sections taken on lines 4—4, 5—5, 6—6 and 7—7 respectively of Fig. 2; Fig. 8 is a longitudinal view of the upper part of a modified form of one of the supporting legs; Fig. 9 is a partial longitudinal section of the same on line 9—9 of Fig. 8; Figs. 10 and 11 are transverse sections taken substantially on lines 10—10 and 11—11 respectively of Fig. 8; Fig. 12 is the upper portion of another modified form of the supporting leg; Fig. 13 is a longitudinal section of the same on line 13—13 of Fig. 12; Figs. 14 and 15 are transverse sections taken substantially on lines 14—14 and 15—15 respectively of Fig. 12; Fig. 16 is an elevational view of the upper part of another modified form of leg; Fig. 17 is a longitudinal section of the same on the line 17—17 of Fig. 16; Fig. 18 is a plan view from above, and Fig. 19 is a transverse sectional view taken on line 19—19 of Fig. 16; Fig. 20 is another elevational view of the upper part of a modified form of leg; Fig. 21 is a longitudinal section on line 21—21 of Fig. 20; Figs. 22 and 23 are transverse sections taken on lines 22—22 and 23—23 respectively of Fig. 20; Fig. 24 is an elevational view of another modified form of leg; Fig. 25 is a longitudinal section of the same on line 25—25 of Fig. 24; Fig. 26 is a plan view from above, and Fig. 27 is a transverse section taken on line 27—27 of Fig. 24; Fig. 28 is an elevational view of another form of leg; Fig. 29 is a transverse section of the same on line 29—29 of Fig. 28; Fig. 30 is a plan view from above, and Fig. 31 is a transverse section taken substantially on line 31—31 of Fig. 28; Fig. 32 is an elevational view of another modification of my improved leg; Fig. 33 is a longitudinal section of the same on line 33—33, and Fig. 34 is a plan view from above, and Fig. 35 is a transverse section of the same on line 35—35 of Fig. 32; Fig. 36 is an elevational view of still another modification of my improved device; Fig. 37 is a longitudinal section of the same on line 37—37 of Fig. 36, and Fig. 38 is a plan view from above, and Fig. 39 a transverse section taken substantially on line 39—39 of Fig. 36.

Throughout all of the various modified forms illustrated, it will be noted that certain predominating features are present in all. Referring particularly to Figs. 1, 2 and 3, it will be noted that in all of the structures the supporting legs 1, which in use preferably comprise a set of three, although obviously the number may be increased as desired, are each provided with a supporting member 2, which is longitudinally adjustable upon the leg 1, and is constructed with a supporting shelf 4, upon which the bottom of the tub 5, or equivalent part, rests, and by which the leg is firmly held to the vessel. All of the various forms of legs are provided at the upper end with a longitudinally telescoping part 6, provided with an overhanging hook 7, which is provided with a backwardly extending section 8, to which is secured an adjusting rod 9, screw-threaded to engage a nut 10 carried on the leg support and operated through a thumb screw, or equivalent member 11, secured to the rod 9. By this means it is obvious that the longitudinally telescoping member 6 may be relatively adjusted upon the leg 1, and the distance between the support 4 and the overhanging hook 7 adjusted relatively to the height of the tub 5, between which two members the edge or side of the tub is engaged, thus firmly binding the leg to the tub, so that the support and tub can be handled as an entirety, or as an integral structure. The various modifications all embrace these essential features, while illustrating the various modifications thereof to secure the same general result. In these various modifications also a secondary feature may or may not be employed as desired, to-wit, the adjustable supporting foot 12 clearly shown in Figs. 1, 2 and 3. This foot is also longitudinally adjustable upon the bottom end of the leg 1, so that the elevation of the tub may be regulated as desired by this means without interfering with the connection of the tub to the legs.

The legs 1 are made of metal, but the form of metal in cross section may be greatly varied as desired, and as clearly illustrated in the various modifications shown. Thus in the form shown in Figs. 1 to 7 inclusive, the leg 1 is formed of angle iron, the other parts being constructed to conform thereto. Of the modifications shown, the adjustable shelf 2 is secured to the leg by bolts or other equivalent means, fitting in suitable holes formed in the leg, thus permitting the adjustable feature referred to. Obviously, with the adjustable or telescoping sleeve, however, the adjustable feature of the shelf support 2 may be omitted, and it may be riveted to the leg, if preferred, although the adjustable feature is considered more desirable as also permitting by this means alone the adjustability of the elevation of the tub on the leg. In the form shown in Figs. 8 to 10 inclusive the leg is still formed of angle iron, but turned at a different angle with one side arranged to lie flat in proximity to the tub. In the form shown in Figs. 12 to 15 inclusive the angle iron form is again employed, bringing the open part of the space between the sides in proximity to the tub. In Figs. 16 to 19 the angle iron is employed, bringing the reverse angle in proximity to the tub. In Figs. 20 to 23 inclusive ordinary T iron is employed for the leg, as is the case in the form shown in Figs. 32 to 35 inclusive. In Figs. 24 to 27 inclusive, round iron or tubular iron is employed for the same purpose. In Figs. 28 to 31 the angle form is employed, showing a different method of forming the hook member on the telescoping sleeve 6; and in 36 to 39 the angular form is employed, showing another method of forming the hook member, as will be hereafter pointed out. Even flat bar iron may be used in some cases.

It will be seen in all the various forms that the sleeve 6 is simply constructed to embrace the leg 1, sufficiently to permit the longitudinal telescoping movement thereon. The block 10 forming a nut for the lower end of the controlling rod 9 may also be secured to the leg in any preferred manner, several different methods being illustrated. Thus nut 10 may be formed by simply bending over the top portion of the leg, as illustrated in Figs. 13, 17, and threading the same, or it may be struck up from the leg as illustrated in Figs. 21 and 33, or as said, in any preferred manner, to serve the purpose, whether formed integral with the leg or formed separately attached thereto.

The engaging hook 7 on the sleeve 6 may also be formed in any preferred manner, several different forms being illustrated. All of them, however, are provided with the rearward extension 8, as stated, to which the longitudinal controlling rod 9 is loosely connected. As shown in Figs. 3 and 4, the part 8 is a separate plate secured to the hook 7, by means of rivets 12. As shown in Figs. 9 and 10, the part 8 is inclosed within a groove formed by the overlapping edges of the part 7. Figs. 13 and 14 show a similar construction, rivets 12 also being employed, as in Figs. 3 and 4. In Fig. 18 a plan view is given, more clearly illustrating the construction, in which the part 8 is retained in place by the overlapping of the edges of the part 7. This gives a very firm and rigid construction, and is preferred where the article to be supported is of considerable weight, and it is necessary to screw the rod 9 down hard to properly engage the hook with the supported article. In Figs. 21 and 22 a similar construction is shown when applied to a leg which is in T-shape in cross section. In Figs. 25 and 26 a section view is given, showing the part 8 as separable from and riveted to the part 7, in a construction in which the leg is round in cross section. In Figs. 29 and 30 another form is shown, in which the part 8 is formed integral with the sleeve. The part is thus slotted on the two sides as indicated in Fig. 30, with the central part bent backward to form a seat for the controlling rod, and the side edges, as at 13, bent forward to form the hook to engage the edge of the tub or the other vessel. In Figs. 33 and 34 a section of the sleeve 6 is bent outward to form the hook, and then simply looped backward to form the part 8, no other means being employed to connect the two parts, while in Figs. 37 and 38 an entire side of the angle iron is bent outward to form the hook, to which is firmly riveted a somewhat heavier section 8.

As stated, the form may be modified, so long as essential features are retained, and the part also strengthened in any of the various ways illustrated, or in any other preferred manner.

By the term non-flat I wish to be understood as meaning a metal plate which is not flat but which may be either round or angular, both forms being shown in the drawings.

Having thus described my invention, it is obvious that various immaterial modifications may be made in the same without departing from the spirit of my invention; hence I do not wish to be understood as limiting myself to the exact form, construction, arrangement and combination of parts herein shown and described and uses mentioned.

What I claim as new and desire to secure by Letters Patent is:—

1. An adjustable leg for supporting vessels comprising a leg made of suitable material carrying upon its upper end a sleeve, the leg and sleeve partially embracing each other, permitting a sliding movement of one upon the other, said sleeve provided with an overhanging and downwardly extending hook adapted to engage the edge of the vessel and a backwardly extending plate reinforcing the hook, in combination with an operating rod loosely engaging the plate member and in threaded engagement with a part carried by the leg, whereby the sleeve and leg may be adjusted one upon the other.

2. A supporting leg for vessels comprising a leg of suitable material, a supporting shelf provided with a sleeve partially embracing and secured to the leg, adapted to support the lower edge of a vessel, in combination with a sleeve conforming to the contour of the leg and in longitudinal engagement therewith, the upper end of the sleeve provided with an overhanging and downwardly extending leg arranged to engage the upper edge of a vessel, a backwardly extending plate carried by the upper end of the sleeve and hook and reinforcing the latter, a rotatable controlling rod loosely engaging the plate with its lower end in threaded engagement with a nut member carried by the leg, whereby the relative distance between the hook and the shelf may be adjusted as desired.

3. In a device of the kind described, a leg of suitable material provided with an upwardly and outwardly extending shelf member having a sleeve extension loosely embracing the leg and adjustably secured thereto, in combination with a longitudinal movable sleeve mounted on the upper end of the leg, provided with an overhanging and downwardly extending hook, a backwardly extending plate secured to the hook and serving to reinforce the same, a rotatably threaded rod loosely connected to the plate with its lower end in threaded engagement with a nut member carried by the leg.

4. In a device of the kind described, a sleeve formed to longitudinally move upon the upper end of a leg, provided with an overhanging and downwardly extending hook, in combination with a coöperating plate, arranged above the hook, with the marginal edges of the hook bent over to embrace the edges of the plate, and a threaded controlling rod loosely engaging the plate.

5. In a device of the kind described and in combination a supporting leg, a supporting shelf secured thereto, a longitudinal movable sleeve upon the upper end of the leg, provided with an overhanging and downwardly extending hook carrying a backwardly extending plate secured thereto, a rotatable controlling rod with its upper end loosely engaging the plate and its lower end in threaded engagement with a nut member carried by the leg, and a longitudinally movable foot upon the lower end of the leg conforming to the contour and partially embracing the same, whereby the length of the leg may be regulated as desired.

6. A device of the kind described comprising a metal leg member non-flat in cross-section, provided with a shelf member conforming in cross-section to the form of the leg and longitudinally supported thereon, in combination with a sleeve mounted on the upper end of the leg, also conforming in cross-section to the leg, provided with an overhanging and downwardly extending hook at its upper end, a backwardly extending plate secured to and carried by the hook, a rotatably threaded rod loosely connected to the plate, with its lower end in threaded engagement with a nut member carried by the leg.

7. In a device of the kind described and in combination, a supporting leg angular in cross-section, a supporting shelf conforming to the shape of the leg and secured thereto, a longitudinally movable sleeve upon the upper end of the leg also conforming in cross-section to the leg, said sleeve being provided with an overhanging and downwardly extending hook carrying a backwardly extending plate, a rotatable controlling rod with its upper end loosely engaging the plate and its lower end in threaded engagement with a nut member carried by the leg.

In testimony whereof, I have hereunto signed my name in the presence of two subscribing witnesses.

FRANK PFEFFER.

Witnesses:
 JOHN W. HILL,
 CHARLES I. COBB.